United States Patent [19]

Han et al.

[11] Patent Number: 5,225,495
[45] Date of Patent: Jul. 6, 1993

[54] CONDUCTIVE POLYMER FILM FORMATION USING INITIATOR PRETREATMENT

[75] Inventors: Chien-Chung Han, Madison; Ray H. Baughman, Morris Plains; Ronald L. Elsenbaumer, Morris Township, Morris County, all of N.J.

[73] Assignee: Richard C. Stewart, II, Morristown, N.J.

[21] Appl. No.: 728,908

[22] Filed: Jul. 10, 1991

[51] Int. Cl.$^5$ .............................................. C08L 75/04
[52] U.S. Cl. ................... 525/327.4; 427/121; 427/212; 427/213.3; 427/213.31; 427/213.32; 427/213.33; 427/213.34; 427/213.36; 525/327.6; 525/328.1; 525/328.2; 525/328.3; 525/328.4; 525/328.5; 525/328.6; 525/329.2; 525/328.7; 525/328.8; 525/329.1
[58] Field of Search ..................... 427/121, 212, 213.3, 427/213.31, 213.32, 213.33, 213.34, 213.36, 222; 525/327.4, 327.6, 328.1, 328.2, 328.3, 328.4, 328.5, 328.6, 328.7, 328.8, 329.1, 329.2, 329.3, 329.4, 329.5, 371

[56] References Cited

U.S. PATENT DOCUMENTS

| 4,321,114 | 3/1982 | MacDiarmid et al. | 524/81 |
| 4,442,187 | 4/1984 | MacDiarmid et al. | 524/81 |
| 4,820,595 | 4/1989 | MacDiarmid et al. | 524/81 |
| 4,851,487 | 7/1989 | Yaniger et al. | 524/81 |
| 4,893,908 | 1/1990 | Wolf et al. | 524/81 |
| 4,940,517 | 6/1990 | Yen Wei | 524/81 |

FOREIGN PATENT DOCUMENTS

0352882A1 1/1990 European Pat. Off. .
0413109A2 2/1991 European Pat. Off. .

OTHER PUBLICATIONS

J-Y Bergeron, "Water Soluble Conducting Poly(Aniline) Polymer" *J. Chem Soc.. Chem. Commun.*, 180–182 (1990).
M. Angelopoulos, "Polyaniline: Solutions, Film and Oxidation State", Mol. Cryst. Li2. Cryst., vol. 160, 151–163 (1988).
B. Villeret, "Memory Effects In Conducting Polymers", *Physical Review Letters*, vol. 63, No. 12., 1285–1287, (Sep. 1989).
C. D. Batich, "Chromatic Changes In Polyaniline Films", *J. Electrochem Soc.*, vol. 137, No. 3, 883–885, (Mar. 1990).
Elizabeth C. Cooper, "Electrically Conducting Organic Films And Beads Based On Conducting Latex Particles" J. Phys. D. Appl. Phy. 22., 1580–1585, (1989).
Akira Watanabe, "Electrochromism Of Polyaniline Film Prepared By Electrochemical Polymerization", *Macromolecules*, 20, 1973–1976, (1987).
E. M. Genies, "Polyaniline: A Historical Survey", *Synthetic Metals*, 36., 139–182, (1990).
Sardar Khan Bahador, "Conductive Thin Films And Memebranes Their Scientific Foundations And Industrial Applications" (pt. 2), Macromol. Chem. Macromol. Symp. 37., 129–147 (1990).

*Primary Examiner*—Maurice J. Welsh
*Attorney, Agent, or Firm*—R. C. Stewart, II; G. H. Fuchs; D. L. Webster

[57] ABSTRACT

This invention relates to a process for forming polyaniline films on a substrate and to composite articles formed by said process.

40 Claims, No Drawings

CONDUCTIVE POLYMER FILM FORMATION USING INITIATOR PRETREATMENT

BACKGROUND OF THE INVENTION

1. Field of the Invention

This invention relates to a process for forming conjugated conductive polymer films or coatings on a substrate. Another aspect of this invention relates to composites comprising a conjugated conductive polymer film or coating on a substrate.

2. Prior Art

Polyaniline is a conducting polymer which is of considerable interest for a variety of applications because of high thermal and environmental stability, high electrochemical recyclability, special optical properties, and very high conductivity compared with conventional polymers. Many of these applications utilize polyaniline as thin film coatings, such as in electrochromic windows and displays, antistat and electrostatic charge dissipation layers, memory layers, rechargeable batteries, sensors, and separation membranes. Examples of such applications of polyaniline are described in (1) "Electrochromism of Polyaniline Film Prepared by Electrochemical Polymerization" by A. Watanabe, K. Mori, Y. Iwasaki, Y Nakamura, and S. Niizuma, *Macromolecules*, 20, 1973-1796 (1987), (2) "Adjustable Tint Window With Electroactive Conductive Polymers" by J. F. Wolf, L. W. Shacklette, G. G. Miller, R. L. Elsenbaumer and R. H. Baughman in U.S. Pat. No. 4,893,908, (3) "Electrochemistry Employing Polyaniline" by A. G. MacDrarmid and N. L. D. Somasiri in U.S. Pat. No. 4,820,595, (4) "Polyaniline: A Historial Survey", by E. M. Genies, A. Boyle, M. Lapkowski, and C. Tsintavis in *Synthetic Metals*, 36, 139-182 (1990), (5) "Conductive Thin Films and Membranes" by S. K. Bahador in *Makromol. Chem., Makromol Symp.* 37, 129-147 (1990), (6) "Chromatic Changes in Polyaniline Films" by C. D. Batich, H. A. Laitinen and H. C. Zhou, *J. Electrochem. Soc.* 137, 883-885 (1990), and (7) "Memory Effects Conducting Polymers" by B. Villeret and M. Nechtschein in *Phys. Rev. Lett.*, 63, 1285, (1989) and (8) "Fabrication of Printed Circuit Boards Using Conducting Polymer" by H. W. Song, J. M. Park and J. R. White in European Patent Application 0413109A2.

Various methods for forming polyaniline films or film coatings are described in the literature. The above references 1-7 describe the electrochemical polymerization of polyaniline. This method requires a conductive substrate, so it is unsuitable for the coating of conventional plastics, and is general expensive. As an alternative to coating by electrochemical processes, polyaniline can be chemically synthesized (see above ref. 4) and then deposited as a film coating on a substrate by either solution methods (see "Polyaniline Solutions, Films and Oxidation State" by M. Angelopoulos, G. E. Asturias, S. P. Ermer, A. Ray, E. M. Scherr, A. G. MacDiarmid, M. Akhtar, F. Kiss and A. J. Epstein *Mol. Cryst. Liq. Cryst.*, 160, 151-163 (1988) and the above reference 4) or by use of polymer latices (see "Electrically Conducting Organic Films and Beads Based on Conducting Latex Partices" by E. C. Cooper and B. Vincent *J. Phys. D: Appl. Phys.* 22, 1580-1585 (1989)). Each of these methods has the disadvantage of requiring separate polymer synthesis and film coating steps. Also, except by using strong acids as solvent or special dopant ions, conductive polyaniline cannot be directly formed from solution so that post deposition doping or thermal processing is usually required to generate the conducting polymer. Additionally, sublimation processes result in low molecular weight coatings and forming adhesive coatings is typically a problem for each of these processes. While improvements in the solubility characteristics of conductive polyaniline can be obtained by appropriate ring or nitrogen substitutions or the use of polymeric counterions, such improvements typically result in a decrease of obtainable conductivity (see "Water-Soluble Conducting Polyaniline Polymer" by J-Y Bergerun, J-W. Chevalier, and L. H. Dao, *J. Chem. Soc., Chem. Commun*, 1990, 180-182, and "Conductive Polymer Materials and Methods and Methods of Producing Same" by S. I. Yaniger and R. E. Cameron in U.S. Pat. No. 4,851,487).

In contrast with the above methods, which require separate polymerization and film forming steps, it is also possible to directly polymerize aniline as a coating material. For example, H. H. Kuhn describes in European Application 0 352 882 A1 the preparation of conductive fabrics by contacting the fiber under agitation conditions with an aqueous solution of an aniline compound, oxidizing agent, and a doping agent or counter ion, the oxidizing agent being a vanadyl compound. Also, C.-H Hsu and E. Vance describe in European Application 0355 518 A2 the process of forming a conductive coating by imbibing an aqueous aniline solution on a organic fiber or film and polymerizing the aniline in situ by contacting the fiber or film with an oxidizing catalyst in an acid aqueous medium. Improvements are needed which provide highly adhering, highly conducting polymers such as polyaniline via a rapid, cost effective process which simultaneously provides polymerization and coating formation.

SUMMARY OF THE INVENTION

This invention relates to a process of forming a composite comprising a film or coating of conducting conjugated polymer by the oxidative coupling of a conjugated backbone monomer on a substrate. More particularly, the process of this invention comprises the steps of:

(a) contacting a substrate with an effective amount of one or more initiating agents capable of "physically" or "chemically" "absorbing" or "adsorbing" on, in, or on and in said substrate, said initiating agent having an oxidation potential less than that of the conjugated monomer of said conjugated backbone polymer and when oxidized being capable of reacting with and coupling to said conjugated monomer to initiate the polymerization of said conjugated monomer to form said conjugated backbone polymer, for a time sufficient to physically and/or chemically adsorb, absorb, or adsorb and absorb said initiating agents on, in, or on and in said substrate; and (b) contacting said substrate having said adsorbed, absorbed, or adsorbed and absorbed initiating agents with a solution comprising one or more solvents, and one or more conjugated monomers having an oxidation potential greater than that of said initiating agent, in the presence of an effective amount of one or more effective oxidizing agent having an oxidation potential greater than the oxidation potential of said initiating agent or agents, such that said oxidizing agents are capable of oxidizing said initiating agents to promote polymerization of said monomer or monomers by the coupling to said initiating agent to form a film or coating of conjugated backbone polymer on at least one surface of said substrate. As used herein, "conjugated monomer" is a compound that has conjugated unsaturation bonds and is capable of being oxidized by oxidants having higher oxidation potentials than the said monomer to form conjugated backbone polymers or oligomers. Useful conjugated monomers are substituted or unsubstituted benzenes, naphthalenes, phenanthrenes, thiophenols, anilines, pyridines, quinolines, carbazole, thiophenes, pyrroles, furans, azulenes, and the like. Other useful monomers are the compounds which comprise more than one unit of the aforementioned monomers of the same class of compounds or of a combination of different classes.

Another aspect of this invention relates to a composite formed in accordance with the process of this invention comprising a substrate having a film or coating comprising a conjugated backbone homopolymer or copolymer on a surface thereof. Yet another aspect of this invention relates to a composite of this invention comprising a substrate having an electrically conductive film or coating comprising a doped conjugated backbone homopolymer or copolymer on a surface thereof.

Several advantages flow from this invention. For example, the formed conjugated backbone polymer coating or film is strongly adhered to the substrate because the conducting polymer chains are covalently bonded to the initiators and anchored at the surface layer of the substrate. The conjugated backbone polymer coating or film formed through this invention will have high strength because a morphological structures established during the growth of the polymer chains.

DESCRIPTION OF THE PREFERRED EMBODIMENTS

In the first step of the process of this invention, a substrate is contacted with an initiating agent which is capable of chemically or physically adsorbing, absorbing, or adsorbing and absorbing on a surface of said substrate. By chemically or physically adsorbing, absorbing or adsorbing and absorbing on a surface of said substrate we mean a variety of enthalpic and entropic processes which result in distribution of the adsorbed or absorbed material at or in proximity to the surface of the substrate. Such processes include processes in which, due either to favorable agent-substrate interactions or a highly porous nature of the substrate, the agent is highly dispersed throughout the substrate volume. Chemical or physical processes which result in adsorbing or absorbing on the substrate include chemical bond formation, hydrogen bond formation, dipolar interactions, charge transfer interactions, entropically driven mixing, void filling, and like processes.

The method of contacting the substrate and the initiating agent may vary widely and depends on a number of factors such as the nature of the substrate and the initiating agent, and the like. One useful method of contacting includes soaking or dipping all or part of the substrate in a solvent or solvent mixture containing one or more initiating agents as a solute, or as either finely dispersed liquid droplets or solid articles. This solvent or solvent mixture can be a melt phase. The above process can be followed by separating the substrate from the solution, and evaporating away the solvent residue and undesired components. Yet another method of contacting includes coating all or part of the substrate with a solution containing one or more initiating agents, and evaporating away the solvent residue and other undesired components. Any conventional coating techniques may be used, such as use of doctor blades, transfer coating, graphic printing, spray coating, sublimation, chemical vapor deposition and sputtering. Suitable contacting methods also include mechanical processes, such as grinding or rolling, which provides the initiator imbedded in the substrate. Alternatively, contacting of the substrate and initiating agent can be made by mixing substrate and initiatingn agent in gaseous, solution, gel, or solid states (or any combination of these states), followed by conventional processing to form the substrate article. In the preferred embodiments of the invention, the substrate and initiating agent are contacted by dissolving the initiating reagent in a solvent to form a solution of the initiating agent, and then contacting the substrate and the solution for a desired length of time.

The initiating agent can be applied either uniformly to the substrate surface or as a patterned deposition. The latter patterned deposition of initiating agent in a patterned deposition/polymerization of the conjugated polymer. Patterned deposition of the initiating agent can be accomplished, for example, analogously to methods used in silk screen, rotary gravure, and related printing processes. Alternatively, the initiating agent can be initially applied uniformly and then removed or chemically deactivated for selected areas, for example by selected area irradiation which induces chemical reaction or causes volatilization. A inverse process is also applicable for forming a patterned array of initiating agent, wherein an initiating agent is initially deposited uniformly over the substrate and photoinduced reaction, resulting in a product of decreased ionization potential, provides a patterned array of initiating agent. An example of such photogeneration of initiating agent the photopolymerization of a conjugated monomer, as for example a substistuted conjugated diacetylene R-C-C-C-C-R, by actinic light, preferably ultraviolet light. Also, conventional negative or positive photoresist technology can be used for either the selected area application of initiating agent the selected area exposure of initiating agent to the conjugated monomer. This method is specially useful when it is desirable to produce very fine circuit elements or circuit interconnects using conjugated backbone conducting polymer, such as polyaniline.

For each of the processes described herein, the conjugated backbone conducting polymer provided can serve as conductor precoats which enable the electroplating of conventional metals on insulating plastics. Because of the thermodynamic instability of conjugated backbone conducting polymers such as polyaniline with respect to dedoping at the potentials required for electroplating of metals, the use of an initial pulse electroplating step, or the use of larger, relatively immobile dopants, is typically desirable in order for such polymers to avoid a metal-to-insulator transition of the conjugated backbone polymer. Alternatively, an intermediate conductor layer, which is less vulnerable to dedoping, can be electrodeposited prior to the electroplating of the metal.

Substrates useful in the practice of this invention may vary widely. The only requirement is that the surface of the substrate is such that the initiating agent can chemically and/or physically absorb, adsorb, or absorb and adsorb on, in, or on and in said substrate. Useful substates may be formed of organic materials, inorganic materials, or a combination of such materials. Illustrative of useful inorganic substrates are materials such as carbon black, graphite, mica, clay, glass, ceramics, SiO$_2$, and the like.

Useful organic substrates include polymeric materials such as thermoset and thermoplastic polymers Thermoset polymers for use in the practice of this invention may vary widely. Illustrative of such useful thermoset polymers are alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; amino resins such as those produced by addition reaction between formaldehyde and such compounds as melamine, urea, aniline, ethylene urea, sulfonamide and dicyandiamide; epoxies such as epoxy phenol novolak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene diisocyanate, 2,4-tolylene diisocyanate, 4,4-diphenylmethane diisocyanate, 1,6-hexamethylene diisocyanate and 4,4'-dicyclohexylmethane diisocyanate with a polyol such as polyether polyol (trimethylol propane, 1,2,6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Thermoplastic polymers for use in the formulation of the composition of this invention may vary widely. Illustrative of such polymers are polyesters such as poly(glycolic acid), poly(ethylene succinate), poly(ethylene adipate), poly(tetramethylene adipate), poly(ethylene azelate), poly(ethylene sebacate), poly(decamethylene adipate), poly(decamethylene sebacate), poly(1,2-dimethylpropiolactone), poly(pivaloyl lactone), poly(para-hydroxybenzoate), poly(ethylene oxybenzoate), poly(ethylene isophthalate), poly(ethylene terephthalate), poly(decamethylene terephthalate), poly(hexamethylene terephthalate), poly(1,4-cyclohexane dimethylene terephthalate), poly(ethylene-1,5-naphthalate), poly(ethylene-2,6-naphathalate), poly(1,4-cyclohexylidene dimethylene-teraphthalate) and the like; polyamides such as poly(4-aminobutyric acid) (nylon 4), poly(6-amino-hexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), poly(hexamethylene adipamide) (nylon 6,6), poly(heptamethylene pimelamide) (nylon 7,7), poly(octamethylene suberamide) (nylon 8,8), poly(hexamethylene sebacamide), (nylon 6,10), poly(nonamethylene azelamide) (nylon 9,9), poly(decamethylene azelamide) (nylon 10,9), poly(decamethylene sebacamide) (nylon 10,11), poly[bis(4-aminocyclohexyl)methane-1,10-decanedicarboxamide] (Quiana)(trans), poly(m-xylene adipamide), poly(p-xylene sebacamide), poly(2,2,2-trimethylhexamethylene terephthalamide), poly(piperazine sebacamide), poly(metaphenylene isophthalamide) (Nomex), poly(p-phenylene terephthalamide) (Kevlar), and the like; polycarbonates such as poly[methane bis(4-phenyl)carbonate], poly[1,1-ethane bis(4-phenyl)carbonate], poly[2,2-propane bis(4-phenyl)carbonate], poly[1,1-butane bis(4-phenyl) carbonate], poly[1,1-(2-methyl propane)bis(4-phenyl) carbonate], poly[2,2-butane bis(4-phenyl)carbonate], poly[2,2-pentane bis(4-phenyl)carbonate], poly[4,4-heptane bis(4-phenyl)carbonate], poly 1,1-(1-phenyl- ethane)bis(4-phenyl)carbonate], poly[diphenylmethane bis(4-phenyl)carbonate], poly[1,1-cyclopentane bis(4-phenyl)carbonate], poly[1,1-cyclohexane bis(4-phenyl) carbonate], poly[thio bis(4-phenyl)carbonate], poly [2,2-propane bis-[4-(2-methyl phenyl)]carbonate], poly [2,2-propane bis-[4-(2-chlorophenyl)]carbonate], poly[2,2-propane bis-[4-(2,6-dichlorophenyl)]carbonate], Poly[2,2-propane bis-[4-(2,6-dibromophenyl)]carbonate], poly[1,1-cyclohexane bis-[4-(2,6-dichlorophenyl) carbonate], and the like; polymers derived from the polymerization of $\alpha,\beta$-unsaturated monomers such as polyethylene, acrylonitrile/butadiene/styrene terpolymer, polypropylene, poly(1-butene), poly(3-methyl-1-butene),poly(1-pentene), poly(4-methyl-1-pentene), poly(1-hexene), poly(5-methyl-1-hexene), poly(1-octadecene), polyisobutylene, poly(isoprene), 1,2-poly(1,3-butadiene) (isotatic), 1,2-poly(-butadiene) (syndiotatic), polystyrene, poly($\alpha$-methylstyrene), poly(2-methylstyrene), poly(4-methylstyrene), poly(4-methoxystyrene), poly(4-phenylstyrene), poly(3-phenyl-1-propene), poly(2-chlorostyrene), poly(4-chlorostyrene), poly(vinyl fluoride), poly(vinyl chloride), poly(vinyl bromide), poly(vinylidene fluoride), poly(vinylidene chloride), poly(tetrafluoroethylene) (Teflon), poly(chlorotrifluoroethylene), poly(vinylcyclopentane), poly(vinylcyclohexane), poly($\alpha$-vinylnaphthalene), poly(vinyl alcohol), poly(vinyl methyl ether), poly(vinyl ethyl ether), poly(vinyl propyl ether), poly(vinyl isopropyl ether), poly(vinyl butyl ether), poly(vinyl isobutyl ether), poly(vinyl sec-butyl ether), poly(vinyl tert-butyl ether), poly(vinyl hexyl ether), poly(vinyl octyl ether), poly(vinyl methyl ketone), poly(methyl isopropenylketone), poly(vinyl formate), poly(vinyl acetate), poly(vinyl propionate), poly(vinyl chloroacetate), poly (vinyltrifluoroacetate), poly(vinyl benzoate), poly(2-vinylpyridine), poly(vinylpyrrolidinone), poly(vinyl-carbazole), poly(acrylic acid), poly(methyl acrylate), poly(ethyl acrylate), poly(propyl acrylate), poly(iso-propyl acrylate), poly(butyl acrylate), poly(isobutyl acrylate), poly(sec-butyl acrylate), poly(tert-butyl acrylate), poly(methacrylic acid), poly(methyl methacrylate), poly(ethyl methacrylate), poly(propyl methacrylate), poly(isopropyl methacrylate), poly(butyl methacrylate), poly(isobutyl methacrylate), poly(sec-butyl methacrylate), poly(tert-butyl methacrylate), poly(2-ethylbutyl methacrylate), poly(hexyl methacrylate), poly(octyl methacrylate), poly(dodecyl methacrylate), poly(octadecyl methacrylate), poly(phenyl methacrylate), poly(benzyl methacrylate), poly(cyclohexyl methacrylate), poly(methyl chloroacrylate), polyacrylonitrile, polymethacrylonitrile, polyacrylamide, poly(N-isopropylacrylamide), and the like; polydienes such as poly(1,3-butadiene) (cis), poly(1,3-butadiene) (trans), poly(1,3-butadiene)(mixt.), poly(1,3-pentadiene) (trans), poly(2-methyl-1,3-butadiene) (cis), poly (2-methyl-1,3-butadiene) (trans), poly(2-methyl-1,3- butadiene)(mixt.), poly(2-tert-butyl-1,3-butadiene) (cis), poly(2-chloro-1,3-butadiene)(trans), poly(2-chloro-1,3-butadiene) (mixt.) and the like; polyoxides such as poly(methylene oxide), poly(ethylene oxide), poly(tetra-methylene oxide) poly(ethylene formal), poly(tetra-methylene formal), polyacetaldehyde, poly(propylene oxide), poly(- hexene oxide), poly(octene oxide), poly(trans-2-butene oxide), poly(styrene oxide), poly(3-methoxypropylene oxide), poly(3-butoxypropylene oxide), poly(3-hexoxypropylene oxide), poly(3-phenoxy- propylene oxide), poly(3-chloropropylene oxide), poly [2,2-bis(chloromethyl)-trimethylene-3-oxide] (penton), poly(2,6-dimethyl-1,4-phenylene oxide) (PPO), poly(2,6-diphenyl-1,4-phenylene oxide) (Texax, P30), and the like; polysulphides such as poly(propylene sulphide), poly (phenylene sulphide) and the like; polysulfones o such as poly[4,4'-isopropylidene diphenoxy di(4-phenylene) sulphone]; noryl, and mixtures thereof.

In the preferred embodiments of this invention, useful substrate forming materials are organic polymeric material.

In the more preferred embodiments of this invention, useful substrates are prepared from polymeric materials which are swellable by an appropriate organic or inorganic solvent to allow more efficient infusion of the initiating agent the surface layers of the substrate, which facilitates the anchoring of the subsequently formed conjugated backbone chain segments on the surface of the substrate. More preferred polymeric substrates are fabricated from polymers which contains atoms other than carbon and hydrogen, such as polyesters, polyamides, polycarbonates, polyoxides, polysulphides, polysulphones, polyacrylates, polymethacrylates, polyacrylic acids, and other acid containing polymers, and the like; and most preferred polymeric substrates are fabricated from polymers such as polyamides, polyesters, polyacrylics, and polymethacrylics. Especially useful polymeric substrates are those heat shrink plastic s, as for example formed, by the chemical or the irradiation-induced crosslinking of a polyolefin, followed by mechanical treatment, according to conventional procedures. One article produced by the present invention using this substrate is heat shrink conducting tubing or films. Such tubing is of value for eliminating electric field inhomogeneities which lead to premature breakdown of dielectrics in high Voltage cables. Also preferred, the polymer substrate can be polymer pellets which are thereafter compression molded to provide a conducting article having high volumetric conductivities at low loading levels of the electrically conducting conjugated backbone polymer. In another preferred embodiment, the polymer substrate can be a circuit board containing through holes for interconnects. The present process provides electrical conductivity for through hole interconnects, which can be enhanced by electroplating or electrophoretic deposition of conventional metals on the electrically conductive conjugated backbone polymer. Suitable methods for electroplating are described in "Modern Electroplating", Ed. by F. A. Lowenhein (John Wiley and Sons, 1974). Methods for electrophoretic deposition of conducting particles are well known in the art and are applicanble to a variety of conductors, including metal oxides. More generally, insulating substrates coated by conducting conductive conjugated polymer deposited by the present process can be thereafter electroplated or coated by electrophoretic deposition because of the electrical conductivity of the conducting conjugated backbone polymer.

Also preferred, the polymer substrate can be a porous foam. Using the present process and such foams, either uniform or density profiled foam conductors can be manufactured for microwave and radiofrequency applications.

Also preferred, the substrate for the present process can be a chain oriented polymer. The advantage resulting for the present process is that the chain orientation of the substrate can provide chain orientation and associated anisotropic optical properties for the deposited polymer film. Alternatively, anisotropy of the conjugated backbone conducting polymer coating of the present invention can be provided by post deposition mechanical drawing of the substrate. Such chain oriented coatings are polarizing for light and infrared radiations, which can be important for display and solar window applications, as well as for applications as an anisotropic conductor.

Additionally the substrate for polymerization need not be solid, but can instead be a liquid phase. This embodiment is preferred for the production of free standing conjugated backbone polymer films by the present process. In such case, the initiating agent can be deposited as a monolayer, multilayer, or alternate thin film coating on the liquid substrate, which is preferably an aqueous liquid. The monomer can be contacted with the initiating agent supported on the liquid substrate either by contact of the initiating agent with a gas phase mixture of oxidizer acid monomer or by comingling of monomer and oxidizing agent with the liquid support for the initiating agent. This comingling is preferably by dissolution, and the monomer and oxidizing agent are preferably present in the liquid substrate prior to deposition of the initiating agent. Also, the liquid substrate for deposition of the initiating agent can be an interface between immiscible liquids.

As another embodiment of the present invention, the initiating agent itself can serve as the substrate. For this purpose, solid initiating agents, such as oligomers of polyaniline, are preferred. However, liquid initiating agents can also provide the dual function of substrate and initiating agent. In the latter case, contact of the monomer and oxidizing agent with the liquid serving the dual functions of initiating agent and substrate is preferably, from the gas phase.

The present coating process also has special value for the deposition of conducting polymers, such as polyaniline, on fillers used for conventional polymers, such as mica and talc. The benefit of using the conducting conjugated backbone polymer coated fillers for composite formation is the combination of enhanced conductivity with the property changes normally associated with the filler addition. Especially important here are pearlescent type composites using flake additives, because of enhanced EMI reflection due to multiple metal-insulator interfaces. Also specially important is the use of inorganic glasses and other materials used for windows as substrates for the present process. When using inorganic substrates, such as window glass, mica, and talc, conventional chemical and surface roughening processes can be used to enhance surface adsorption/absorption of the initiating agent.

Useful initiating agents may vary widely. The only requirements are that such agents have an oxidation potential less than that of the monomer, are capable of physically and/or chemically absorbing and/or adsorbing on and/or in the surface of the substrate selected for use, and are capable, when oxidized, of reacting with and coupling to the monomer to initiate polymerization of the monomers. Illustrative of useful initiating agents are the compounds which are highly conjugated compounds comprising one or more the recurring moieties depicted below:

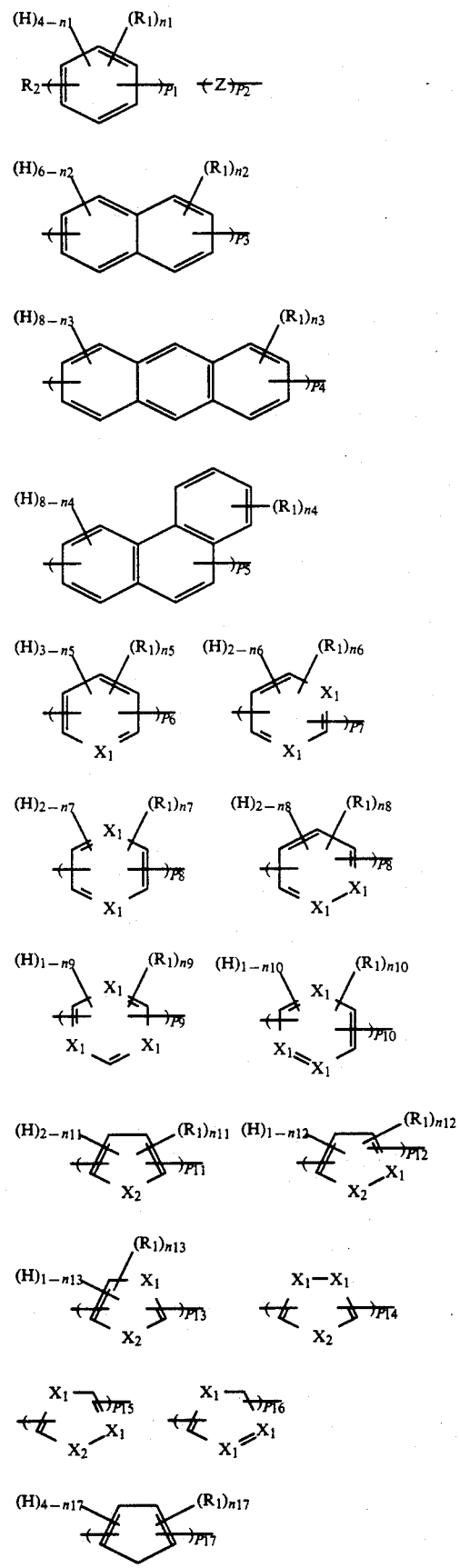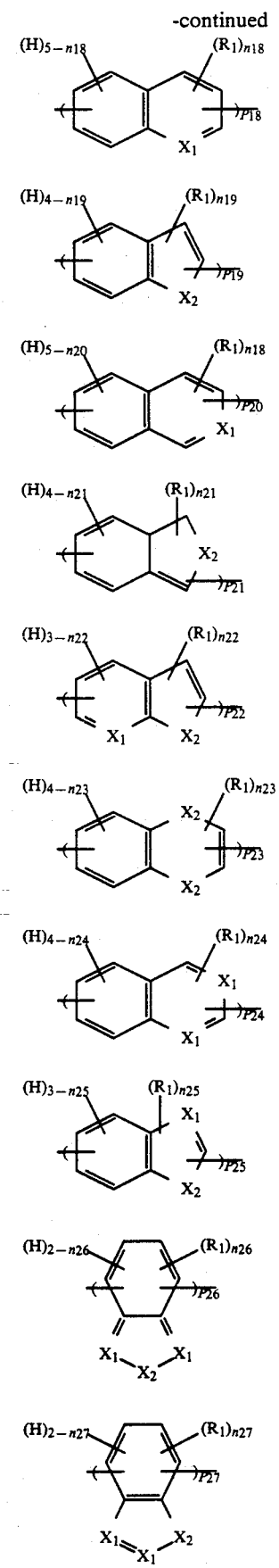

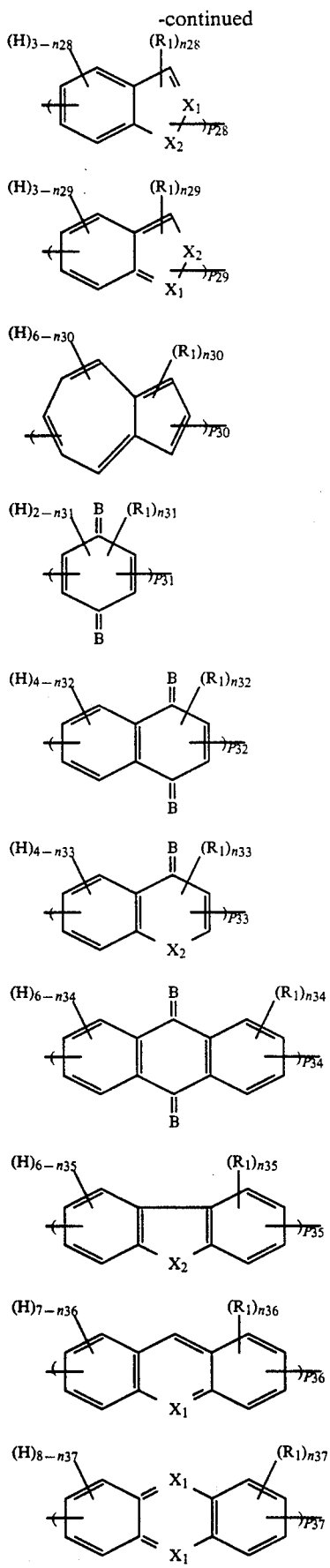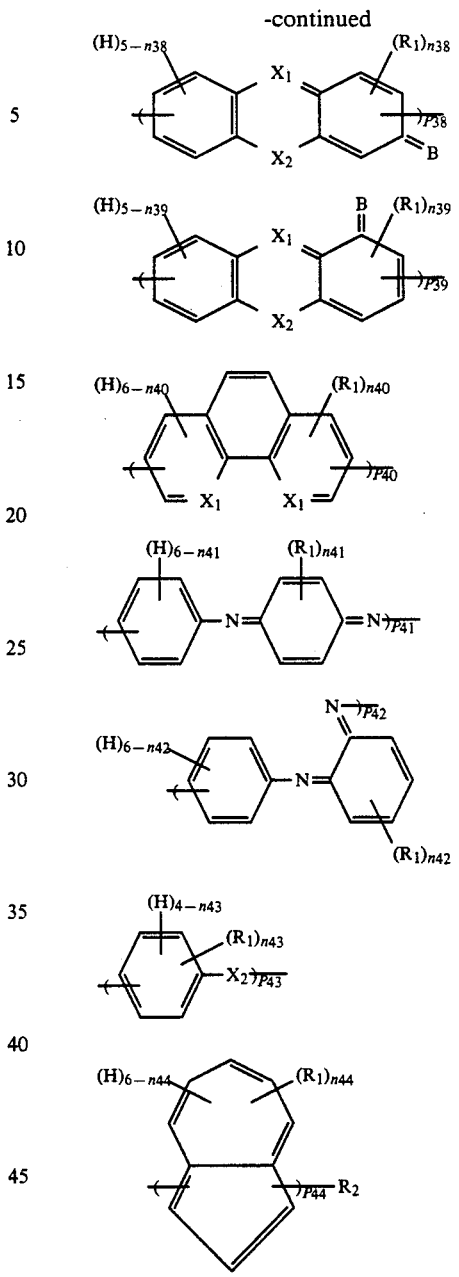

wherein:
R₁ and R₂ are as defined in the below;
=X₁— is the same or different at each occurrence and is =N—, =P—, =SiR₇—, or —B—;
—X₂— is the same or different at each occurrence and is —S—, —O—, —Se—, —BR₇—, —S(R₇)₂—, —PR₇— or —NR₇—, wherein R₇ is the same or different and are hydrogen, substituted or unsubstituted alkyl, aryl, arylalkyl or alkylaryl;
p₀ to p₄₄ are the same or different at each occurrence and are integers equal to or greater than 0;
n₁, to n₄₄ are the same or different at each occurrence and are equal to or greater than zero, with the proviso that each n is selected such that the number of hydrogen atoms is equal to or greater than zero; and
—Z— is the same or different at each occurrence and is —CR₁,=CR₁,—, —C≡C—, —NR₇—, —S—, —O—, —P(R₇)—, —Se—, —N(R₇)—N(R₇)—, —C-

(O)—, —C(O)O—, —O—C(O)—, —C(O)— —N(R$_7$)—, N(R)—C(O)—, —S(O)—, —O—S(O)—, —S(O)—O—, —N=N—, —S(O)$_2$—, —OS(O)$_2$O—, —O—S(O)—, —S(O)$_2$—O—, —C(R$_1$)=N—, —N=C(R$_1$)—, —C(B)—, where B is the same or different at each occurrence and is =N(R$_7$), =N(R$_7$)$^+_2$, =O, =S, =P(R$_7$), =Se, alkylidene, or alkylidene substituted with one or more alkyl, aryl, or R$_1$.

For example, pyrrole can be used as an initiating agent for the polymerization of aniline, because pyrrole has a lower oxidation potential than aniline. Similarly pyrrole can also be used as an initiating agent for the polymerization of other conjugated systems having an oxidation potential lower than aniline such as benzene, thiophene and naphthalene. Also for dimeric or oligomeric anilines can be used as the initiating agents for the polymerization of aniline, because they have lower oxidation potentials than the monomeric aniline due to higher degrees of conjugation. Similarly dimeric or oligomeric pyrroles, thiophenes, furans, and benzenes can be used as the initiators for the polymerizations of the corresponding monomeric compounds or a mixture of the monomeric compounds.

The initiating agent is not necessarily the same type as the monomeric compounds provided it has a lower oxidation potential than the monomeric compounds. For an example, dimeric aniline can be used as the initiating agent for the polymerization of thiophene. For another example, oligomeric aniline can be used as the initiator for the polymerization of pyrrole.

Moreover, the initiating agent need not necessarily oxidatively polymerizable. For example, highly conjugated dye compounds can be used as the initiating agents for the polymerization of the aforementioned conjugated monomers, as long as the employed dye compound has a lower oxidation potential than that of the subjected conjugated monomer.

The initiating agent can also be only a part of some large molecules or even a part of polymers. For an example poly(vinyl pyrrole) can be used as an initiator for the polymerization of benzene.

Useful initiators can also be an inorganic compound or material. Illustrative of useful inorganic compounds or materials are graphite, carbon black, carbon 60, other fullerenes, and the like.

Various methods shown in the art can be used to determine whether or not the oxidation potential of a molecule is lower than that of the monomer of the conjugated backbone polymer (such as aniline for polyaniline), which is a prerequisite for the suitability of such molecule as an initiating agent in the processes of this invention. Illustrative of these methods are those described in Chapter VII in "An Introduction to Electrochemistry" by S. Glasstone (Van Nostrand Co, 1942). The simplest method for such determination of the oxidation potential of a molecule, and the method herein preferred is by cyclic voltametry. Various quantum chemical methods, such as the Valence Effective Hamiltonian method, can be used to theoretically estimate the oxidation potential of a molecule versus that of the monomer of the conducting polymer (such as aniline for polyaniline), although uncertainties result both because of the approximations of the method and untreated solvent effects.

In the preferred embodiments of the invention the initiating agent is an oligomer of the same genus or species as the polymer being formed. Preferred initiating agents are oligomers of the conjugated backbone polymer having from about 2 to about 50 repeat units. More preferred oligomeric initiating agents of the conjugated backbone polymer are oligomers having aniline repeat units such as homopolymer oligomers and copolymer oligomers having substituted or unsubstituted phenyleneamine or quinone imine recurring units, or a combination thereof of the type, derived from the polymerization of unsubstituted and substituted anilines of the Formula I:

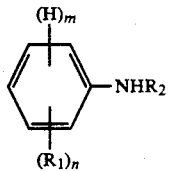

wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such halogen, hydrogen or other leaving group;

R$_2$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two R groups together or any R$_2$ group together with any R$_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or R is an aliphatic moiety having repeat units of the formula:

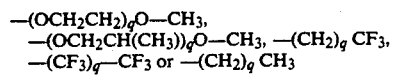

wherein q is a positive whole number; and

R₂ is selected from the group consisting of permissible R₁ substituents and hydrogen.

Illustrative of useful R₁ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful R groups are divalent moieties derived from any two R₁ groups or a R₁ group with a R₂ group such as moieties having from about 2 to about 7 repeat units of the formula:

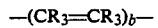

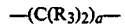

wherein R₃ is the same or different at each occurrence and is hydrogen or alkyl, as for example —(CH₂)₄—, —(CH₂)₃—, —(CH=CH—CH=CH)—, —[CH₂—CH(CH₃)—CH₂]— and —(CH₂)₅—, and groups comprised of such moieties which include one or more heteroatoms of oxygen, nitrogen, ester, sulfonyl, carbonyl, sulfinyl, and/or sulfur, such as —CH₂SCH₂— —CH₂NHCH₂—, —SCH₂NHCH₂—, —O—CH₂—CH₂O— —O—CH₂—S—CH₂—, —CH₂S(O₂)CH₂—, —CH₂S(O)CH₂—, —OC(O)CH₂CH₂—, —CH₂C(O)CH₂— and —CH₂—O—CH₂— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful R₃ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran, aminobenzodiazine, benzethiopyrone amine, amino-coumarin, benzthiopheneamine, benzothiodiazoleamine, and the like.

Exemplary of useful R₂ groups are hydrogen and the above-referenced representative R₁ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred for use as oligomeric polyaniline initiators in the practice of this invention are those of the type derived from aniline of the above Formulas I in which:

n is an integer from 0 to about 2;

m is an integer from 2 to 4, with the proviso that the sum of n and m is equal to 4;

R is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents; and R₂ is the same or different at each occurrence and is a R₁ substituent or hydrogen;

z is an integer equal to or greater than about 5.

Particularly preferred oligomers and polyanilines for use in the practice of this invention those of the type derived from head to tail polymerization of the above Formula I in which:

n is an integer from 0 to 1;

m is an integer from 3 to 4, with the proviso that the sum of n and m is equal to 4;

R is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents; and R₂ is the same or different at each occurrence and is a R₁ substituent or hydrogen.

The number of aniline repeat units in the preferred oligomeric aniline initiating agent may vary widely as long as it is sufficiently low to allow solvation of the aniline oligomeric initiating agents in the solvent of choice. For example, the number of repeat units can be as low as about 2, 3 or 4, and it can be as high as about 500 or 5000, or even higher. In general, the upper limit of the number of repeating unit is not critical, as long as the said initiating agent is soluble in the solvent of choice. In general, the number of aniline repeat units is from about 2 to about 50. In the preferred embodiments of the invention, the number of aniline repeat units is from about 2 to about 40, and in the particularly preferred embodiments, the number of repeat units is from about 2 to about 30. Amongst the particularly preferred embodiments, most preferred are those embodiments in which the number of aniline repeat units is from about 2 to about 20.

In the preferred embodiments, the initiating agents (preferably an oligomeric aniline) is contacted with the substrate in solution. The concentration of initiating agent in the solution may vary widely. Any concentrations can be used as long as they are convenient for operation. In general, the upper concentration level of initiating agent is not critical, and usually higher concentration levels are preferred because they provide for entrapped or entanglement of more initiating agent in, on, or on and in the substrate, which in term provides for more sites for propagation of the polymer from the surface of the substrate. The concentration of the initiating agent is usually from about 0.01 to about less than 100 wt % based on the total weight of the solution, and is preferably from about 0.1 to about 50 wt % on the aforementioned basis. In the more preferred embodiments of the invention, initiating agent concentrations are from about 1 to about 40 wt % based on the total weight of the solution, and in the most preferred embodiments are from about 1 to about 20 wt % on the aforementioned basis.

Solvents useful in the practice of these preferred embodiments of the invention may vary widely. The only requirement is that the solvent is capable of dissolving the required quantity of initiating agent. Preferred solvents have dielectric constants measured at room temperature (i.e. 10°-30° C.) equal to or greater than 2.2. Illustrative of such useful solvents are water; dimethylsulfoxide; amides such as formamide, acetamide, N,N-dimethyl formamide, N,N-dimethyl acetamide, N-methyl pyrrolidinone, pyrrolidinone, and the like; alcohols and glycols such as methanol, ethanol, propanol, butanol, pentanol, hexanol, octanol, glycol, glycerol, propanediol, benzyl alcohol, cresol, phenol, cyclohexanol, 2-methoxy ethanol, and the like; ketones, such as acetone, 2-butanone, 3-pentanone, cyclohexanone, 2,4-pentadione, acetophenone, benzophenone, and the like; amines, such as methylamine, dimethylamine, dipropylamine, triethylamine, dibenzyl amine, picoline, and the like; nitro compounds of aliphatic and aromatic hydrocarbons such as nitromethane, nitroethane, nitrobenzene, nitrotoluene, nitroaniline, tetranitromethane, and the like; halogenated aliphatic and aromatic hydrocarbons such as methylene chloride, chloroform, chloromethane, dibromoethylene, trichloroethane, chlorobenzene, o-difluorobenzene, bromotoluene and the like; esters such as methyl formate, ethyl acetate, ethyl acetoacetate, methyl benzoate, benzyl acetate, ethyl oleate, butyl starate, methyl salicylate, dimethyl phthalate, and the like; ethers such as methyl ether, ethyl ether, phenyl ether, tetrahydrofuran, 1,4-dioxane, and the like; phosphates, such as tricresyl phsophate, and the like; and silicates such as tetraethylsilicate, and the like; More preferred solvents are those having a relative dielectric constant equal to or greater than about 3.0 such as water, dimethyl sulfoxide, amines, alcohols, ketones, and nitrohydrocarbons. Particularly preferred solvents are those having a relative dielectric constant equal to or greater than about 4.0, such as water, dimethyl sulfoxide, amines, and alcohols. The most preferred solvent is water due to environmental safety, and process economics.

In the second step of the process, the substrate having the adsorbed, absorbed or adsorbed and absorbed initiating agent is contacted with a solution comprising solvent and at least one conjugated monomer and an oxidizing agent having an oxidation potential greater than that of said initiating agent under process conditions such that the monomer in the solution couples to the adsorbed, absorbed or adsorbed and absorbed initiating agent and polymerizes on a surface of the conjugated substrate. Contacting methods may vary widely and include those discussed above for use in step (a). In the conduct of step (b), the substrate can be removed from contact with the solution used in step (a) and then contacted with the solution for use in step (b) containing the conjugated monomer and a solvent which may be the same as or different from the solvent used in step (a). Alternatively, a sufficient amount of monomer can be merely added to the solution used in step (a) to form the solution for use in step (b).

Conjugated monomers useful in the practice of this invention may vary widely and any conjugated monomer which can be polymerized by oxidative coupling may be used. Illustrative of such conjugated monomers are substituted or unsubstituted thiophenols, benzenes, naphthalenes, phenanthrenes, carbazoles, benzimidazoles, quinolines and anilines.

In the preferred embodiments of the invention the monomer is a substituted or unsubstituted aniline.

The conjugated monomer used in step (b) may vary widely. The conjugated monomer may be the same as that used in the formation of the conjugated monomer oligomeric initiating agent of step (a) in the preferred embodiments of the invention or may be different. The following listing of substituted and unsubstituted anilines are illustrative of those which can be used as conjugated monomers in the practice of this invention.

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | N,N-Dimethylaniline |
| 2-(Methylamino)aniline | 4-Benzylaniline |
| 2-(Dimethylamino)aniline | 4-Aminoaniline |
| 2-Methyl-4-methoxy-carbonylaniline | 2-Methylthiomethylaniline |
| | 4-(2,4-Dimethylphenyl) aniline |
| 4-Carboxyaniline | 2-Ethylthioaniline |
| N-Methyl aniline | N-Methyl-(2,4-dimethyl) aniline |
| 2,4-Dimethylaniline | |
| N-Propyl aniline | N-Propyl-m-Toluidine |
| N-Hexyl aniline | N-Methyl-o-Cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thioacetylaniline |
| m-Hexylaniline | 2,5-Dichloroaniline |
| m-Octylaniline | 3-(n-Butanesulfonic acid) aniline |
| 4-Bromoaniline | |

| | |
|---|---|
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Ethylthioaniline |
| 5-Chloro-2-methoxy-aniline | 3-phenoxyaniline |
| 5-Chloro-2-ethoxy-aniline | 4-phenoxyaniline |
| N-Hexyl-m-toluidine | N-Octyl-m-toluidine |
| 4-Phenylthioaniline | 4-Trimethylsilylaniline |
| 3-Amino-9-methylcarbazole | 3-Amino carbazole |
| 4-Amino carbazole | N-(p-Amino phenyl) aniline |

Preferred anilines are within the scope of Formula I. More preferred and most preferred anilines are as described above in reference to those anilines used to form the aniline oligomeric initiating agent used in step (a).

The amount of conjugated monomer included in the polymerization/coating solution may vary widely depend on a number of factors such as the solubility of the monomer in the solvent of choice, the thickness of the coating desired, and the length of the processing time desired. In general, the amount of conjugated monomer is at least about 0.001 % by weight of the solution. Preferably the amount of conjugated monomer is from about 0.01 to about 90 % by weight of the solution, more preferably from about 0.1 to about 70 % by weight of the solution and most preferably from about 1 to about 50 % by weight of the solution.

The substrate and the solution comprising the conjugated monomer are contacted under conditions suitable for polymerizing the monomer of the solution on, in, or on and in the substrate. In the preferred embodiments of the invention, this is carried out by addition of an "effective amount" of an "effective oxidizing agent" to the solution. As used herein, an "effective oxidizing agent" is any oxidizing agent which has an oxidation potential greater than that of the initiating agent and is capable of inducing oxidation of the initiating agent. Thus, the nature of the oxidizing agent will vary widely depending on the initiating agent employed. Illustrative of useful oxidizing agents are ammonium persulfate, sodium dichromate, potassium permanganate, chromic acid, hydrogen peroxide, ferric chloride, potassium dichromate and the like. In the preferred embodiments of the invention, the oxidizing agents are selected such that the agent has an oxidation potential which is greater than that of the initiating agent and less than that of the aniline, which significantly reduces the number of polymerization initiated at the conjugated monomer in the solution away from the surface of the substrate. An effective amount of the oxidizing agent is used. As used herein, an effective amount is an amount which is sufficient to oxidize at least 10% by mole number based on the total mole number of the initiating agent present on the surface of the subjected substrate. The preferred amount of the oxidizing agent is at least 50% by mole number based on the total mole number of the initiating agent on the surface. The more preferred amount of the agent added is at least 100% by mole number on the aforementiond basis. The particularly preferred amount of the agent added is at least 500% by mole number on the aforementioned basis. The most preferred amount of the agent added is at least 1000% by mole number on the aforementioned basis. The upper limit of the amount of the oxidizing agent added is not critical. Theoretically one can use any amount of oxidizing agent as long as it does not significantly destroy the desired properties of the coating. The preferred amount of the oxidizing agent added is not greater than 300% by mole number based on the total mole number of the conjugated monomer in the solution. The more preferred amount of the agent added is not greater than 200% by mole number on the aforementioned basis. The particularly preferred amount of the agent added is not greater than 150% by mole number on the aforementioned basis. The most preferred amount of the agent added is not greater than 130% by mole number on the aforementioned basis.

The amount of oxidizing agent used in any situation will usually depend on the relative oxidation potentials of the oxidizing agent, monomer, and the initiating agent. In these preferred embodiments of the invention, the amount of oxidizing agent is selected such that the degree to which the monomer in solution polymerizes is reduced. In those instances where the oxidizing agent has an oxidation potential which is greater than that of the monomer, the amount of oxidizing agent is usually not much greater then the amount of initiating agent on the surface of the substrate, which minimizes the oxidation of the monomer which has an oxidation potential greater than that of the initiator. On the other hand, in those instances where the oxidation potential of the oxidizing agent is less than that of the monomer, the amount of oxidizing agent may vary widely because the oxidizing agent is not capable of oxidizing like monomer.

The above step is carried out such that the initiating agent is oxidized and reacts with the monomer forming a reactive species which then is oxidized to form an oxidized species formed from a combination of the initiating agent and monomer. This formed new species is oxidized again and then reacts with another monomer to form another species comprised of an initiating agent and two recurring monomer units. The process continues until the desired polymer forms a layer of the desired average thickness and area.

In general, the number of monomeric repeat units and thickness of the layer are not critical and may vary widely depending on the desired use of the composite substrate. The number of monomeric repeat units is usually least about 10 although fewer repeat units can be used. In the preferred embodiments of the invention, the number of monomeric repeat units is at least about 20, and in the particularly preferred embodiments, the number of monomeric repeat units is at least about 30. Amongst the particularly preferred embodiments, most preferred are those embodiments in which the number of monomeric repeat units is at least about 40.

In the preferred embodiments, the polymer is polyaniline. As used herein, "polyaniline" consists of repeat units of the Formulas II and III

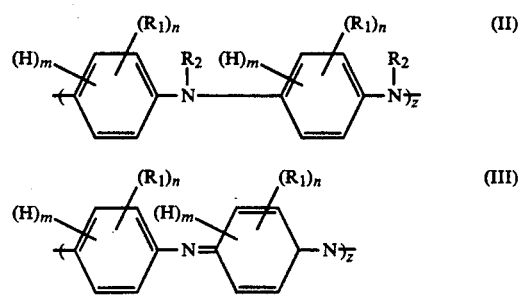

or a combination thereof having various ratios of the above repeat units in the polyaniline backbone such as leucoemeraldine, protoemeraldine, emeraldine, nigraniline and pernigraniline.

Illustrative of the polyanilines useful in the practice of this invention are those of the Formulas IV to VII;

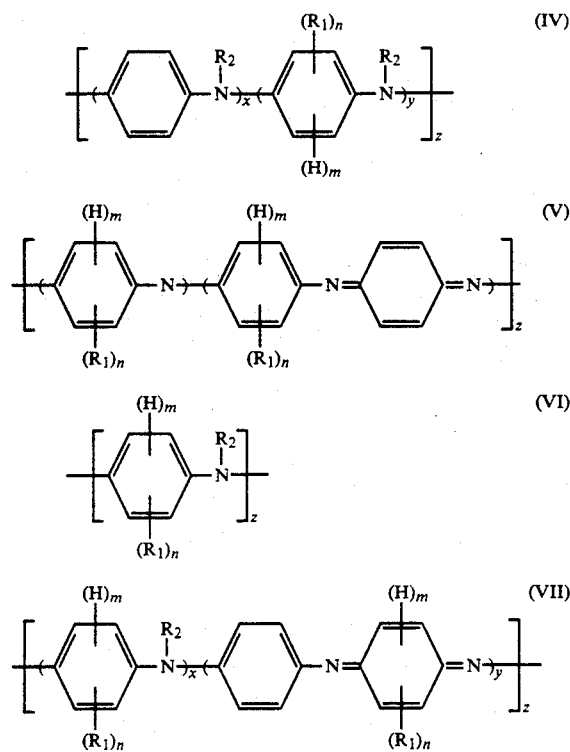

wherein:

n, m, $R_1$ and $R_2$ are as described above;

x and y are the same or different at each occurrence and are integers equal to or greater than 0, with the proviso that the sum of x and y is greater than 0, preferably were x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than 1.

Preferred for use in the practice of this invention are polyanilines of the above Formulas IV to VII in which:

n is an integer from 0 to about 3;

m is an integer from 1 to 4, with the proviso that the sum of n and m is equal to 4;

R is alkyl, aryl or alkoxy having from 1 to about 30 carbon atoms, sulfinic acid, sulfinate, sulfinic acid salt, amino, alkylamino, dialkylamino, arylamino, diarylamino, hydroxyamino, hydroxy, phosphinate alkylsulfonyl, arylsulfonyl, sulfonic acid, sulfonate, phosphinic acid, phosphinic acid salt, phosphinate carboxylic acid, carboxylate, phosphonic acid, phosphonate, phosphonic acid salt, cyano, halo, or alkyl, aryl or alkoxy substituted with one or more phosphonic acid, phosphoric acid, borate, sulfonate, carboxylate, phosphonate, phosphonic acid salt, boric acid, phosphinic acid, phosphinate, phosphinic acid salt, sulfinic acid, sulfinate, sulfinic acid salt, carboxylic acid or sulfonic acid substituents;

$R_2$ is the same or different at each occurrence and are hydrogen, sulfinic acid, sulfinic acid salt, sulfonate, sulfinate, sulfonic acid, phosphinic acid, phosphinate, phosphinic acid salt, carboxylic acid, carboxylate, phosphonic acid, phosphonate, phosphonic acid salt, or phenyl or alkyl substituted with sulfonic acid, sulfonate, phosphinic acid, phosphinate, phosphonic acid salt, carboxylic acid, carboxylate, sulfinic acid, sulfinate, sulfinic acid salt, boric acid, borate, phosphonic acid or phosphonate, phosphonic acid salt substituents;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are polyanilines of the above Formulas IV to VII in which:

n is an integer from 0 to 2;

m is an integer from 2 to 4, with the proviso that the sum of n and m is equal to 4;

R is alkyl, alkoxy, amino, alkylamino, dialkylamino, arylamino, diarylamino, hydroxyamino, hydroxy, alkylsulfonyl, arylsulfonyl, carboxylic acid, carboxylate, phosphinic acid salt, phosphinic acid, sulfonic acid, sulfonate, sulfinic acid, phosphonic acid, sulfinic acid salt, phosphonic acid salt, or alkyl substituted with carboxylic acid, phosphinic acid, sulfinic acid, phosphinic acid salt, halo, sulfinic acid salt, sulfonate, carboxylate, phosphonic acid, phosphonic acid salt, or sulfonic acid substituents; wherein the aliphatic components of R substituents include from 1 to about 30 carbon atoms and the aryl components of any R substituent include from 6 to about 30 carbon atoms;

$R_2$ is the same or different at each occurrence and are hydrogen, alkyl, carboxylic acid, amino, alkylamino, dialkylamino, arylamino, diarylamino, hydroxyamino, hydroxy, alkylsulfonyl, arylsulfonyl, sulfinic acid, sulfonic acid salt, carboxylate, phosphinic acid salt, sulfonic acid, phosphonic acid, sulfinic acid salt, phosphonic acid salt, or alkyl substituted with one or more carboxylic acid, sulfinic acid, sulfinic acid salt, carboxylate, phosphinic acid salt, phosphinic acid, sulfonic acid, sulfinate salt, phosphonic acid or phosphonic acid salt substituents; wherein the aliphatic components of any $R_2$ substituent include from 1 to about 30 carbon atoms and the aryl components of any $R_2$ substituent include from 6 to 30 carbon atoms;

x is an integer equal to or greater than 2;

y is equal to or greater than 0, with the proviso that the ratio of x to y is greater than about 1; and z is an integer equal to or greater than about 10.

Amongst the particularly preferred embodiments, most preferred for use in the practice of this invention are polyanilines of the above Formulas V or VII in which:

n is an integer from 0 to 1;

m is an integer from 3 to 4, with the proviso that the sum of n and m is equal to 4;

$R_1$ is alkyl of from 1 to about 20 carbon atoms, carboxylic acid, carboxylate, sulfonic acid, sulfonate, sulfinic acid, sulfinic acid salt, phosphinic acid, phosphinic acid salt, or alkyl of from 1 to about 20 carbon atoms substituted with one or more halo, carboxylic acid, carboxylate, sulfonic acid, sulfonate, sulfinic acid, sulfinic acid salt, phosphinic acid or phosphinic acid salt, phosphonic acid, phosphonic acid salt, substituents;

$R_2$ is carboxylic acid, methyl, ethyl, carboxylate, carboxylic acid, sulfonic acid, sulfonate, sulfinic acid, phosphinic acid, phosphinic acid salt, sulfinate, phosphonic acid, phosphonic acid salt, salt or hydrogen;

x is an integer equal to or greater than 2; and y is an integer equal to or greater than 1, with the proviso that the ratio of x to y is greater than 1; and z is an integer equal to or greater than about 10.

In the most preferred embodiment of the invention n is 0;

m is 4;

x is an integer equal to or greater than 2;

y is an integer equal to or greater than 1 with the proviso that the ratio of x to y is greater than 1; and z is an integer equal to or greater than about 10.

The polymer layer coated on substrate may be doped with a suitable dopant to render the polymer electrically conductive, i.e. an electrical conductivity of at least about $10^{-9}$ ohm$^{-1}$cm$^{-1}$ by the four-in-line probe method described in "Laboratory Notes on Electrical Galvanometric Measurements" by H. H. Wieder, Elsevier Scientific Publishing Co. New York, N.Y. (1979). Any doping procedure may be used. Such methods are conventional and will not be discribed herein in any great detail. For example, the polymer is best doped by contacting the dopant with the polymer for a time sufficient to doped in the desired extent. The polymer can be contacted with the dopant in the gaseous state, in the liquid state, neat, or diluted by some suitable diluent such as a gas as for example air, or liquid such as water or an organic liquid. The dopant can be contacted with the conjugated backbone polymer either during polymerization or after polymerization. In a preferred embodiment of the invention, the homopolymer or copolymer may be doped in situ by carrying out the polymerization in the presence of a dopant, as for example and preferably an acid having a pKa in the solution equal to or less than that of the homopolymer or copolymer. In these preferred embodiments, the higher the pKa of the conjugated backbone polymer, the higher the acid pKa of the acid can be used to provide a conductive polymer; and conversely, the lower the pKa of the conjugated backbone polymer, the lower the pKa of the acid has to be used to provide a desired degree of electrical conductivity. The pKa of the acid is preferably equal to or less than about 5, more preferably equal to or less than about 4, and the most preferably equal to or less than about 3.

In another preferred embodiment of the invention, the conjugated copolymer or homopolymer can be doped after polymerization. For example, the polymer layer is doped by contact with a solution of the dopant in a suitable solvent such as water.

Dopants for use in the practice of this invention can vary widely and can be such materials which are known in the art for use in doping conjugated backbone polymers to form conductive or semi-conductive polymers, as for example, those described in detail in U.S. Pat. Nos. 4,442,187 and 4,321,114 which are hereby incorporated by reference. Illustrative of useful dopant species are oxidizing dopants. Oxidizing dopants are well known in the conductive polymer art, and any of such known oxidizing dopants can be used. Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_5$, $NOSbF_5$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $ZnCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, Fe(OTs)$_3$, and $Fe(CF_3SO_3)_3$ which give rise to doped polymers containing dopant ions such as $NO_3^-$, $CH_3SO_3^-$, $AlCl_4^-$$BF_4^-$, $ZnCl_4^-$, $PCl_4^-$, $PF_6^-$, $AsF_6^-$, $SbF_6^-$, $CF_3SO^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$, $POCl_3$, and Fe(III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred oxidizing dopants are those embodiments in which the oxidizing dopant is $FeCl_3$.

Illustrative of other dopants are protonic acid dopants. Such dopants include inorganic acids, such as hydrofluoric acid, hydroiodic acid, phosphoric acid, nitric acid, boric acid, sulfuric acid and the like.

Illustrative of still other useful dopants are non-oxidizing protonic acids such as those containing anionic moieties of the formula:

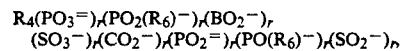

and having one or more cationic moieties selected from the group consisting of:

wherein:

$R_4$ and $R_6$ are the same or different at each occurrence and are organic radical or amino;

$M^{+s}$ is a species having a positive charge equal to s, provided that at least one of $M^{+s}$ is a proton or a moiety which can be transformed by radiation, heat, chemicals and the like, into a proton under use conditions such as $NH_4^+$, $^+N(CH_3)_2H_2$, $Ph_3S^+$, $^+(C_2H_5)H_3$ and the like;

s is the same or different at each occurrence and is an integer equal to ? to 8;

r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl.

The nature of the $M^{+n}$ group may vary widely. For example, $M^{+n}$ may be be a non-metal cation such as $Bu_4N^+$, $H^+$, $NO^+$, $NO_2^+$, $NH_4^+$, $^+N(CH_3)_2H_2$, $^+N(C_2H_5)H_3$, and the like, or may be a metal cation such as $Na^+$, $Li^+$, $Ag^+$, $Ba^{+2}$, $Co^{+3}$, $Al^{+3}$, $Fe^{+3}$ and the like.

Preferred for use in the practice of this invention are organic acid dopants, more preferably those having anionic moieties of the formulas:

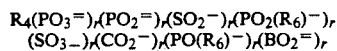

and having a cationic moiety of the Formula:

wherein at least one of the cationic moieties of the formula $M^{+s}$ is a proton or is a moiety which can be transformed into a proton under use conditions;

$M^{+s}$ is a cationic species having or positing charge s;

s is an integer equal to or greater than 1, preferably from 1 to about 8;

$R_4$ and $R_6$ are organic radicals or amino, and r is an integer equal to or greater than 1, preferably from 1 to about 8;

More preferred for use in the practice of this invention as dopants are acids or acid derivatives of the formula:

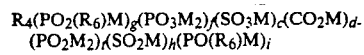

or

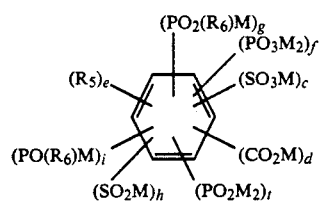

wherein:

M is $H^+$, or other metal or non-metal cation with the proviso that at least one of M is $H^+$ or a moiety which can be thermally or chemically transformed into a proton under use conditions, such as $^+NH_4$, $^+N(CH_3)_2H_2$, $^+N(C_2H_5)H_3$, $Ph_3S^+$ and the like t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1 or 2; and $R_4$ and $R_5$ are the same or different at each occurrence and are nitro, cyano, hydroxy, halo, amino, alkylamino, dialkylamino, arylamino, diarylamino, alkylarylamino, alkoxy, substituted or unsubstituted alkoxy, aryl or alkyl having from 1 to about 30 carbon atoms, wherein permissible substituents include sulfonate salt, perhaloalkyl, phenyl, alkoxy, halo, cyano, amino, haloalkyl, hydroxy, sulfonic acid, phosphoric acid phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two $R_4$ or any two $R_5$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is a moiety of the formula:

$-(CH_2)_qCF_3$, $-(CF_2)_qCF_3$, $-(CH_2)_qCH_3$ $-(OCH_2CH_2)_qOCH_3$ or
$-(OCH_2CH(CH_3))_qOCH_3$ wherein:

q is a positive whole number from 1 to about 10; and $R_6$ is alkyl, aryl, aryloxy or alkoxy.

In the particularly preferred embodiment of this invention, useful dopants are acids and/or acid derivatives of the above formula:

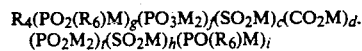

or

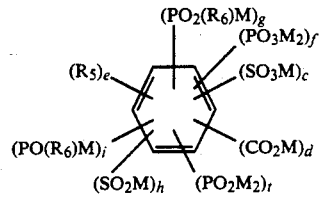

wherein:

c is 0, 1, 2 or 3;

d, t, f, g, h and i are the same or different at each occurrence and are with the proviso that at least one of c, d, t, f or g, i or h is other than 0;

e is 0, 1 or 2;

$R_4$ and $R_5$ are the same or different are hydroxy, amino, alkylamino, dialkylamino, arylamino, diarylamino, alkyl aryl amino, substituted or unsubstituted phenyl or alkyl, wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two $R_6$ substituents together may form an unsubstituted or substituted alkylene or alkenylene chain completing a naphthalene, anthracene or phenanthracene fused ring system wherein permissible substituents are as described above or $R_4$ or $R_5$ is a moiety of the formula:

$-(CH_2)_qCF_3$, $-(CF_2)_qCR_3$, $-(CH_2)_qCH_3$, $-(OCH_2CH_2)_qOCH_3$ or
$-(OCH_2CH(CH_3))_qOCH_3$ wherein:

q is a positive whole number from 1 to about 10;

$R_6$ is alkyl, alkoxy, aryloxy or aryl; and

M is $H^+$, or other metal or non-metal cation, with the proviso that at least one of M is $H^+$ or a moiety which can be thermally or chemically transformed into a proton under use conditions.

In the most preferred embodiments of this invention, useful dopants are acids and/or acid derivatives of the formula:

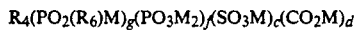

$$R_4(PO_2(R_6)M)_g(PO_3M_2)_f(SO_3M)_c(CO_2M)_d$$

or

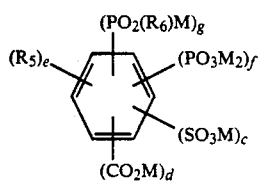

wherein:

c, d, e, f and g are the same or different and are 0, 1 or 2, with the proviso that at least one of c, d, f and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid phosphinate salt, phosphonate salt, amino or carboxylic acid groups, or phenyl substituted with one or more alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any two $R_4$ or $R_5$ substituents together may form an alkylene or alkenylene chain completing a naphthalene anthracene or phenanthracene fused system which may be substituted with one or more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a proton under process conditions.

In the especially preferred embodiments of this invention, useful dopants are acids or acid derivatives of the formula:

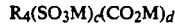

$$R_4(SO_3M)_c(CO_2M)_d$$

or

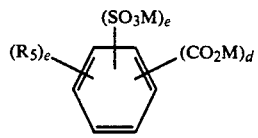

wherein:

c is 1, 2 or 3;

d is 1, 2 or 3 with the proviso that at least one of c, d is not 0 e is 0, 1 or 2;

$R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_4$ and $R_5$ substituents together may form an alkylene or alkenylene chain completing a naphthalene, anthracene or phenanthracene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups;

M is $H^+$ or other metal or non-metal cation or a moiety which can be thermally transformed into a proton under process conditions.

In the process of the embodiment of this invention of choice, the dopant is a sulfonic acid or sulfonic acid derivative of the formula:

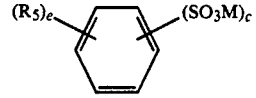

wherein;

c is 1, 2 or 3;

e is 0, 1 or 2;

$R_5$ is alkyl or alkyl substituted with one or more groups, or any two $R_2$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The following is a listing of dopants which are useful in the practice of the most preferred embodiments of this invention for formation of the dopant solute.

1-anthracene sulfonic acid,
9-anthracene sulfonic acid,
2-phenanthrene sulfonic acid,
3-phenanthrene sulfonic acid,
9-phenanthrene sulfonic acid,
$NO_2CF_3SO_3$,
$CF_3SO_3H$, perflouro octyl sulfonic acid
perfluoro octyl carboxylic acid
octylsulfonic acid,
dodecylsulfonic acid,
cetylsulfonic acid,
toluenesulfonic acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
ethane sulfonic acid
1,5-naphthalene disulfonic acid,
nickel phthalocyanine tetrasulfonic acid,
phenyl phosphonic acid,
diphenyl phosphinic acid
phenyl phosphinic acid,
3-sulfopropyl acrylate,
3-sulfopropyl methacrylate,
sulfamic acid,
5-sulfosalicyclic acid,
trion (4,5-dihydroxy-1,3-benzene disulfonic acid),
vinyl sulfonic acid,
sulfanilic acid,
4-sulfophthalic acid,
sulfoacetic acid,
methyl phosphinic acid,
phenylphosphonic acid,
methyl phosphonic acid,
methyl orange,
sulfonated polystyrene,
sulfonated poly(2-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-naphthalene-4-hydroxy sulfonic acid,
4-bromo benzene sulfonic acid,
4-hydroxy-5-isopropyl-2-methyl benzene sulfonic acid
3,4-diamino benzene sulfonic acid
benzenephosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-napthalene-1-hydroxy sulfonic acid,
4-phenylamino benzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

The amount of dopant added to the polyaniline is not critical and may vary widely. In general, sufficient dopant is added to the polyaniline to at least form doped polymer which is a semi-conductor which has a conductivity of at least about $10^{-9}$ ohm$^{-1}$cm$^{-1}$ a measured by the four-in-line probe method. The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-6}$ ohm$^{-1}$cm$^{-1}$ and in the particularly preferred embodiments is sufficient to provide a conductivity of from about $10^{-3}$ ohm$^{-1}$cm$^{-1}$ to about $10^{+2}$ ohm$^{-1}$cm$^{-1}$. Amongst these particularly preferred embodiments, most preferred are those embodiments in which unsubstituted polyaniline is employed and in which sufficient dopant is employed to provide a conductivity of at least about $10^{-1}$ ohm$^{-1}$cm$^{-1}$ to about $10^{+2}$ ohm$^{-1}$cm$^{-1}$, with amounts sufficient to provide a conductivity from about $10^0$ ohm$^{-1}$cm$^{-1}$ to about $10^{+2}$ ohm$^{-1}$cm$^{-1}$ usually being the amounts of choice.

The electrically conductive polyaniline of the invention, and the composition of this invention can be used for any purpose for which conductive polymers are useful. Examples of articles include conductive polymer housings for EMI Shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; optically transparent or non-transparent corrosion-preventing coatings for corrodible materials such as steel; antistatic materials and optically transparent or non-transparent coatings for packaging electronic components; carpet fibers; waxes for floors in computer rooms; antistatic finishes for CRT screens, aircraft, and auto windows; and the like.

Various other applications are anticipated for the conducting coatings produced by the present processes, such as in conducting plastic gas tanks; solar window coatings; transparent electrical elements for heated windows and heated liquid crystal displays; electrochromic displays, electrical contacts for electroluminescent displays and electroluminescent lights, and electrical contacts for piezoelectric films for transparent loud speakers; transparent conducting coatings for windows in burglar alarm systems; membrane coatings for chemical separations (such as $O_2$ and $N_2$, for example); and conducting coatings for membrane switches; and a discharge layer or photoresist layer for lithographic process.

Specially useful coating of conducting polymers are those which are transparent in the visible spectral region. By transparent in the visible region, it is meant that at least 30% of the solar energy spectrum in the visible region is transmitted by the coating. Since transparency is inversely related to conducting polymer thickness, a desired degree of transparency can be obtained by limiting the thickness of this layer, such as by limiting contact time with the initiating agent or with monomer and oxidizing agent. Dual pane windows for the control of solar heating are a particularly useful application area for use of the present process for depositing transparent conjugated polymer coatings.

The following specific examples are presented to more particularly illustrate the invention, and should not be construed as being limitations on the scope of the invention.

EXAMPLE 1

To a solution containing 1770 mL of $H_2O$, 50 g of aniline (0.54 mole) and 172 g p-toluene sulfonic acid (0.90 mole) was added, dropwise at 15° C., a solution of ammonium persulfate (153.4 g in 336.5 mL $H_2O$) over a period of 40 minutes. After addition, the reaction was allowed to continue at 15° C. for a 0.5 hours.

The resultant solid precipitate was collected and washed with 6 L of an aqueous toluene sulfonic acid solution (10 wt %) and then by 3 L of methanol. The resultant blue-black solid was dried in air for 25 hrs and dried at 130° C. for 3 hrs. under dynamic vacuum to give poly(anilinium tosylate) as a green powder. The conductivity of the dried and pressed pellet formed from this material was 1 S cm$^{-1}$ as measured by the co-linear four-probe method. The conductivity of the moisture-saturated pellet was 20 S cm$^{-1}$.

The yield was 78 g. The intrinsic viscosity (in concentrated $H_2SO_4$, at 25° C.) was 0.66 dL/g. Elemental analysis of the dried green powder gave:

| C:64.27 (Wt %) | H:44.86% | N:8.59% |
|---|---|---|
| S:8.40% | O:13.51% | |
| Moisture: less than 0.8 wt % | | |

EXAMPLE 2

A piece of polyethylene terephthalate film (5×5 inch) was coated via a transfer coating technique with a 2.3 wt % solution of poly(anilinium tosylate) which was prepared from the product obtained in example 1 using pyrrolidine as the solvent. In this coating technique, polyaniline solution was homogeneously laid down on the plastic film by a metal screen roller which contains hundreds of regularly engraved cells per square inch. The coated blue film was then heat-dried to give a green conductive film. The surface resistivity was measured to be $1.8 \times 10^8$ ohm/sq.

EXAMPLE 3

A portion (1×2 inch) of the polyaniline-coated polyethylene terephthalate (PET) film (coated on one side only) prepared in example 2 was soaked in a 100 mL solution containing 2.32 g aniline and 9.51 g p-toluene sulfonic acid. Then 0.4 mL solution of ammonium peroxydisulfate, APS, (prepared by dissolving 157 g of ammonium peroxydisulfate in 270 mL deionized water) was added to induce the polymerization of aniline. The anilinium solution stayed colorless for about 2 minutes after the addition of APS solution; while the polyaniline-coated PET film turned blue within a few seconds. This result indicated that the polymerization initiated preferentially from the initiator (i.e. the polyaniline coating on PET film).

After 10 minutes, the green, transparent, polyaniline-coated PET film was lifted out of the solution, rinsed with a 10 wt % aqueous solution of p-toluene sulfonic acid, and then rinsed with deionized water. The originally light green initiator (i.e. the polyaniline) coating turned much deeper green, indicating the polymerization indeed happened on the top of the initiator coating.

The surface resistance of the initiator-embedded side was measured by a 4-in-line probe as $3.1 \times 10^3$ ohm/sq which is at least 5 orders of magnitude more conductive than the other side without initiator. This result indicated that embedding of initiator indeed greatly enhanced the coating of polyaniline on the surface of a substrate.

EXAMPLE 4

Another portion (1×2 inch) of the polyaniline-coated polyethylene terephthalate (PET) film (coated on one side only) prepared in example 2 was soaked in a 100 mL solution containing 1.62 g o-toluidine and 9.67 g p-toluene sulfonic acid. Then 0.4 mL solution of ammonium peroxydisulfate, APS, (prepared by dissolving 157 g of ammonium peroxydisulfate in 270 mL deionized water) was added to induce the polymerization of o-toluidine. The o-toluidinium solution stayed colorless for about 4 minutes after the addition of APS solution; while the polyaniline-coated PET film turned blue within a few seconds. This result indicated that the polymerization initiated preferentially from the initiator (i.e. the polyaniline coating on PET film).

After 10 minutes, the green, transparent, polyaniline-coated PET film was lifted out of the solution, rinsed with a 10 wt % aqueous solution of p-toluene sulfonic acid, and then rinsed with deionized water. The originally light green initiator (i.e. polyaniline) coating turned much deeper green, indicating that a coating of poly(o-toluidine) developed on the top of the initiator coating.

The surface resistance of the initiator embedded side was measured by a 4-in-line probe as $2.9 \times 10^4$ ohm/sq which is at least 4 orders of magnitude more conductive than the other side without initiator. This result indicated that embedding of initiator indeed greatly enhance the coating of poly(o-toluidine) on the surface of a substrate.

EXAMPLE 5

A piece of nylon film (3×3 inch) was embedded with N-phenyl-1,4-phenylene diamine as the initiator by soaking the film in a solution containing 2 g of N-phenyl-1,4-phenylene diamine and 150 mL methanol for half an hour. This embedded film was then rinsed with methanol to remove any initiator solution residue from the surface and then air-dried. A pink-brown nylon film was obtained.

EXAMPLE 6

The initiator (N-phenyl-1,4-phenylene diamine) embedded nylon film prepared in Example 5 was air-dried for half an hour, and then soaked in a 100 mL aqueous solution containing 2.32 g aniline and 9.51 g p-toluene sulfonic acid.

Then 0.92 mL of ammonium peroxydisulfate solution, APS, (prepared by dissolving 157 g ammonium peroxydisulfate in 270 mL deionized water) was added dropwisely into the above solution to induce the polymerization of aniline. The polymerization initiated preferentially from the coated initiator, evidenced by the appearing of blue color on the film and in its surrounding area within about 30 seconds; while the rest of the solution stayed colorless for about 2 minutes.

After 15 minutes of the addition of APS solution, the polyaniline-coated, green, transparent nylon film was lifted out of the solution and rinsed with 10 wt % aqueous solution of p-toluene sulfonic acid, and then rinsed with deionized water.

The surface resistance was measured as $1.8 \times 10^4$ ohm/sq by a 4-in-line probe The adhesion of the polyaniline coating to the nylon film was excellent. The coating survived rubbing, scratching and did not peel off by the application of Scotch tape.

EXAMPLE 7

Another piece of nylon film embedded with initiator (N-phenyl-1,4-phenylene diamine) prepared as in Example 5 was air-dried for 2.5 hour, and then soaked in a 100 mL aqueous solution containing 1.62 g o-toluidine and 9.67 g p-toluene sulfonic acid.

Then I.2 mL of ammonium peroxydisulfate solution, APS, (prepared by dissolving 157 g ammonium peroxydisulfate in 270 mL deionned water) was added dropwisely into the above solution to induce the polymerization of o-toluidine. The polymerization initiated preferentially from the coated initiator, evidenced by the appearing of blue color on the film and in its surrounding area within about 30 seconds; while the rest of the solution stayed colorless for about 4 minutes.

After 28 minutes of the addition of APS solution, the poly(o-toluidine) coated, green, transparent nylon film was lifted out of the solution and rinsed with a 10% aqueous solution of p-toluene sulfonic acid, and then rinsed with deionized water.

The surface resistance was measured as $9.5 \times 10^5$ ohm/sq by a 4-in-line probe. The adhesion of the polyaniline coating to the nylon film was excellent. The coating survived rubbing and scratching and did not peel off by the application of Scotch tape.

What is claimed is:

1. A process of forming a composite comprising a conjugated backbone homopolymer or copolymer on a substrate, said process comprising:
   (a) contacting a substrate with an effective amount of an initiating agent capable of physically or chemically adsorbing, absorbing, or adsorbing and absorbing on a surface of said substrate, said initiating agent having an oxidation potential less than that of a first conjugated monomer of a conjugated backbone homopolymer and when oxidized being capable of reacting with and coupling to said conjugated monomer to initiate the oxidative polymerization of said conjugated monomer to form a conjugated backbone homopolymer on a surface of said substrate said initiating agent contacted for a time sufficient to physically, chemically, or physically and chemically adsorb, absorb, or absorb and adsorb said initiating agent on, in, or on and in said substrate to form a contacted substrate;
   (b) contacting said contacted substrate with said first conjugated monomer, and an effective amount of an effective oxidizing agent having an oxidation potential greater than the oxidation potential of said initiating agent such that said oxidizing agent oxidizes said initiating agent to initiate the polymerization of said conjugated monomer to form a coating of said conjugated backbone homopolymer comprising recurring monomeric units derived from said first conjugated monomer on a surface of said contacted substrate; and
   (c) optionally contacting said homopolymer coated substrate with a second conjugated monomer having an oxidation potential greater than that of said homopolymer and an effective amount of an effective oxidizing agent having an oxidation potential greater than that of said homopolymer to initiate the polymerization of said second monomer with said homopolymer to form a coating of a conjugated backbone block copolymer comprising recurring monomeric units derived from said first and second monomers.

2. A process according to claim 1 wherein step (b) is carried out in the presence of an acid having a pKa in said solution less than the pKa of said conjugated backbone homopolymer or copolymer.

3. A process according to claim 2 wherein said conjugated monomer is a substituted or unsubstituted aniline and said conjugated backbone copolymer or homopolymer is a polyaniline.

4. A process according to claim 3 wherein said aniline is of the formula I:

wherein:
n is an integer from 0 to 5;
m is an integer from 0 to 5, with the proviso that the sum of n and m is 5 and with the further proviso that at least one position of the aniline ring, preferably at the para position, is substituted with a substituent which will allow coupling of the aniline units such halo, hydrogen or other leaving group;
$R_1$ is phosphinic acid, phosphonic acid, sulfonic acid, boric acid, phosphoric acid, alkylamino, dialkylamino, arylamino, diarylamino, alkylarylamino, amino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, phosphinate salt, alkylamino, dialkylamino, arylamino, diarylamino, phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two $R_1$ substituents or any one R substituent and $R_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or $R_1$ is an aliphatic moiety having repeat units of the formula:

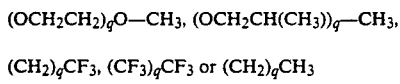

wherein
Q is a positive whole number; and
$R_2$ is the same or different at each occurrence and is $R_1$ substituents or hydrogen.

5. A process according to claim 4 wherein said initiating agent is an oligomeric polyaniline having from 2 to about 50 repeat aniline units.

6. A process according to claim 5 wherein said initiating agent is an oligomeric polyaniline having aniline repeat units derived from said monomer.

7. A process according to claim 5 wherein the polyaniline comprises repeat units of the Formulas II or III:

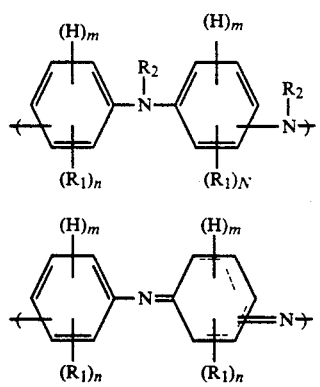

or any combinations thereof;
wherein:
n is an integer from 0 to 5;
m is an integer from 0 to 5, with the proviso that the sum of n and m is 5 and with the further proviso that at least one position of the aniline ring, preferably at the para position, is substituted with a substituent which will allow coupling of the aniline units such halo, hydrogen or other leaving group;
$R_1$ is phosphinic acid, phosphonic acid, sulfonic acid, boric acid, phosphoric acid, alkylamino, dialkylamino, arylamino, diarylamino, alkylarylamino, amino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, phosphinate salt, alkylamino, dialkylamino, arylamino, diarylamino,phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or $R_1$ is an aliphatic moiety having repeat units of the formula:

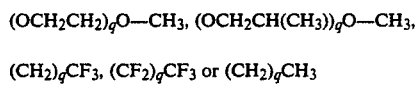

wherein
q is a positive whole number; and
$R_2$ is the same or different at each occurrence and is $R_1$ substituents or hydrogen.

8. A process according to claim 7 wherein said homopolymer or copolymer is composed of the Formulas IV to VII

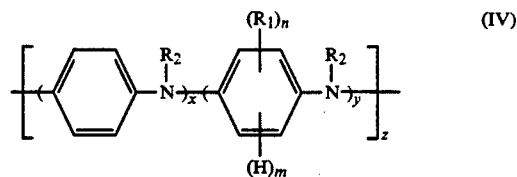

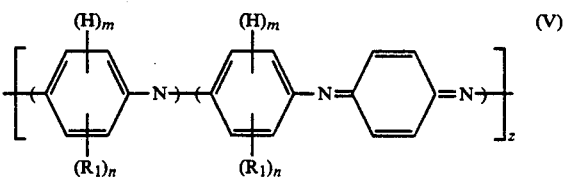

-continued

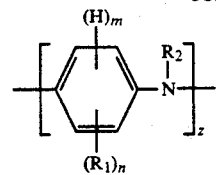
(VI)

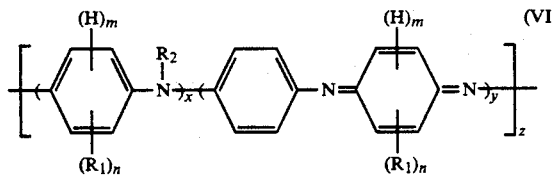
(VII)

wherein:
x and y are the same or different at each occurrence and are integers equal to or greater than 0, with the proviso that the sum or x and y are greater than 0;
z is an integer equal to or greater than about 1;
n is an integer from 0 to 3;
m is an integer from 1 to 4, with the proviso that the sum of n and m is 4;
$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arythio, arylsulfinyl, alkoxycarbonyl, phosphinic acid, phosphonic acid, alkylsilyl, boric acid, arylsulfonyl, carboxylic acid, halo, hydroxy, phosphate salt, sulfonate salt, phosphonate salt, borate salt, phosphinate salt, carboxylate salt, nitro, cyano, sulfonic acid, phosphoric acid or aryl, alkyl or alkoxy substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salt, phosphinic acid, phosphinate salt, carboxylate salt, phosphonic acid or borate salt substituents; or any two $R_1$ groups or any one $R_1$ group and $R_2$ group together may form a substituted or unsubstituted alkylene or alkenylene chain completing a 3, 4, 5, 6, 7, 8, 9 or 10 membered heteroaromatic, heteroalicyclic, aromatic or alicyclic carbon ring, which chain may optionally include one or more divalent nitrogen, ester, carbonyl, sulfur, sulfinyl, sulfonyl or oxygen group, wherein permissible substituents are one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salts, phosphinic acid, phosphinate salt, carboxylate salts, phosphonic acid or borate salt substituents.
$R_2$ is the same of different at each occurrence and is $R_1$ substituents or hydrogen.

9. A process according to claim 3 wherein m is from about 2 to about 4.

10. A process according to claim 9 wherein m is from about 3 to about 4.

11. A process according to claim 5 wherein said polyaniline is derived from substituted anilines.

12. A process according to claim 5 wherein said polyaniline is derived from unsubstituted aniline.

13. A process according to claim 7 wherein $R_1$ is the same or different at each occurrence and is alkyl or alkoxy having from 1 to about 30 carbon atoms.

14. A process according to claim 13 wherein $R_1$ is the same or different at each occurrence and is alkyl having from 1 to about 10 carbon atoms or alkoxy having from 1 to about 20 carbons.

15. A process according to claim 5 wherein n is 0 or 1.

16. The process of claim 5 wherein $R_1$ is alkyl or substituted alkyl.

17. A process according to claim 8 wherein said homopolymer or copolymer is of the Formulas IV to VII wherein:
n is an integer from 0 to about 2;
m is an integer from 2 to 4, with the proviso that the sum of n and m is equal to 4;
$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salt, carboxylic acid or sulfonic acid substituents;
$R_2$ is the same or different at each occurrence and is a $R_1$ substituent or hydrogen;
x is an integer equal to or greater than 1;
y is equal to or greater than 0; and
z is an integer equal to or greater than about 5.

18. The process according to claim 17 wherein:
n is an integer from 0 to 1;
m is an integer from 3 to 4, with the proviso that the sum of n and m is equal to 4;
$R_1$ is aryl, alkyl or alkoxy having from 1 to about 10 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylyarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents;
$R_2$ is the same or different at each occurrence and is a $R_1$ subsituent or hydrogen;
x is an integer equal to or greater than 2;
y is equal to or greater than 0; and
z is an integer equal to or greater than about 5.

19. The process of claim 18 wherein:
n is an integer from 0 to 1;
m is an integer from 3 to 4, with the proviso that the sum of n and m is equal to 4;
$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents wherein aromatic moieties include from 6 to about 21 carbon atoms and the aliphatic moieties are from 1 to about 15 carbon atoms;

$R_2$ is hydrogen;

x is an integer equal to or greater than 2;

y is equal to or greater than 0, with the proviso that the ratio of x to y is equal to or greater than about 1; and z is an integer equal to or greater than about 5.

20. The process of claim 18 wherein:
n is 0 or 1;
m is 3 or 4, with the proviso that the sum of n and m is 4;
$R_1$ is sulfonic acid, a hydrolyzable derivative of sulfonic acid, alkoxy or alkyl; and
$R_2$ is hydrogen.

21. The process of claim 20 wherein:
n is 1;
m is 3;
$R_1$ is sulfonic acid or a hydrolyzable derivative thereof; and
$R_2$ is hydrogen.

22. The process of claim 20 wherein:
n is 0;
m is 4; and
$R_2$ is hydrogen.

23. The process of claim 21 wherein $R_1$ is sulfonic acid or a salt thereof.

24. The process of claim 23 wherein $R_1$ is sulfonic acid.

25. The process of claim 1 wherein said conjugated copolymer or homopolymer is polyaniline copolymer or homopolymer which process further comprises doping said polyaniline to form electrically conductive polyaniline.

26. The process of claim 25 wherein said polyaniline is doped by carrying out said step (b) in the presence of an acid having a pKa in said solution less than that of said polyaniline.

27. The process of claim 26 wherein said polyaniline is doped with one or more organic acid dopants or salts thereof having anionic moieties of the formula:

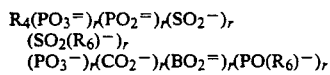
$(SO_2(R_6)^-)_r$
$(PO_3^-)_r(CO_2^-)_r(BO_2^=)_r(PO(R_6)^-)_r$ and having a cationic moiety of the formula:

$M^{+s}$ wherein at least one of the cation moieties of the formula $M^{+s}$ is a proton or is a moiety which can be transformed into a proton under use conditions;

$M^{+s}$ is a cationic species having a positive charge s;
s is an integer equal to or greater than 1;
$R_4$ and $R_6$ are organic radicals or amino; and
r is an integer equal to or greater than 1.

28. The process of claim 27 wherein said dopants are acids or acid derivatives of the formula:

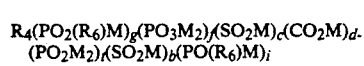

or

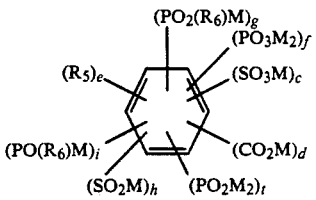

wherein:

M is $H^+$, or other metal or non-metal cation with the proviso that at least one of M is $H^+$ or a moiety which can be thermally or chemically transformed into a proton under use conditions, such as t is 0, 1, 2, 3 or 4;
i is 0, 1, 2, 3 or 4;
h is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4 with the proviso that at least one of t, i, h, c, d, f or g is other than 0;
e is 0, 1 or 2; and $R_4$, $R_5$ and $R_6$ are the same or different at each occurrence and are nitro, cyano, hydroxy, halo, amino, alkylamino, dialkylamino, arylamino, diarylamino, alkylarylamino, alkoxy, or substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two $R_6$ or any two $R_5$ or any $R_4$ and $R_6$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is a moiety of the formula:

$-(CH_2)_qCF_3, -(CF_2)_qCF_3, -(CH_2)_qCH_3$ $-(OCH_2CH_2)_qOCH_3$ or
$-(OCH_2CH(CH_3))_qOCH_3$ wherein:

q is a positive whole number from 1 to about 10.

29. The process of claim 28 wherein said dopants are acids, acid derivatives or a combination thereof of the above formula:

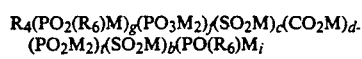

or

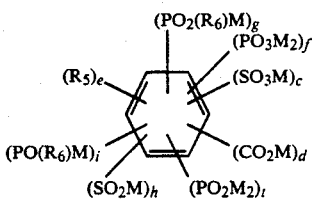

wherein:
- c is 0, 1, 2 or 3;
- d, t, i, f, g and h are the same or different at each occurrence with the proviso that at least one of c, h, i, t, d, f or g is other than 0;
- e is 0, 1 or 2;
- $R_6$ is alkyl, alkoxy, aryloxy or aryl;
- $R_4$ and $R_5$ are the same or different and are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two $R_6$, or any two $R_5$ or any $R_4$ and $R_6$ substituents together may form an unsubstituted or substituted alkenylene chain completing a naphthalene, anthracene or phenanthracene fused ring system wherein permissible substituents are as described above or $R_4$ or $R_5$ is a moiety of the formula:

$$-(CH_2)_qCF_3, -(CF_2)_qCF_3, -(CH_2)_qCH_3,$$
$$-(OCH_2CH_2)_qOCH_3 \text{ or }$$
$$-(OCH_2CH(CH_3))_qOCH_3$$

wherein:
- q is a positive whole number from 1 to about 10; and
- M is $H^+$, or other metal or non-metal cation, with the proviso that at least one of M is $H^+$ or a moiety which can be thermally or chemically transformed into a proton under use conditions.

30. The process of claim 29 wherein said dopants are acids and/or acid derivatives of the formula:

$$R_4(PO_2(R_6)M)_g(SO_3M)_c(CO_2M)_d$$

or

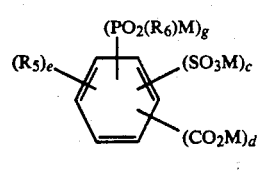

wherein:
- c, d, e, and g are the same or different and are 0, 1 or 2 with the proviso that at least one of c, d, and g is not 0;
- $R_6$ is aryl, aryloxy, alkyl or alkoxy;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphinate salt, amino or carboxylic acid groups, or phenyl substituted with one or more alkyl, alkoxy, fluoroalkyl, sulfonic acid, phosphinic acid, phosphinic salt, sulfonate salt, carboxylate, hydroxy, nitro, cyano, or carboxylic acid groups or any two $R_6$ or any two $R_5$ or any $R_4$ and $R_6$ substituents together may form an alkenylene chain completing a naphthalene anthracene or phenanthrene fused system which may be substituted with one or more alkyl, alkoxy, fluoro, phosphinic acid, phosphinate salt, fluoroalkyl, sulfonic acid, sulfonate salt, carboxylic acid, carboxylate salt, hydroxy, nitro, amino or cyano groups; and M is $H^+$ or other metal or non-metal cation, with the proviso that at least one of M is $H^+$ or is a moiety which can be thermally transformed into a proton under process conditions.

31. The process of claim 30 wherein said dopants are acids, acid derivatives or a combination thereof of the formula:

$$R_4(SO_3M)_c(CO_2M)_d$$

or

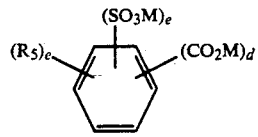

wherein:
- c is 1, 2 or 3;
- d is 0, 1 or 2, with the proviso that at least one of c, or d is not 0;
- e is 0, 1 or 2;
- $R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_5$ substituents together may form an alkylene or alkenylene chain completing a naphthalene, anthracene or phenanthracene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups; and M is H+ or other metal or non-metal cation or a moiety which is thermally transformed into a proton under process conditions.

32. The process of claim 31 wherein said dopant is a sulfonic acid, a sulfonic acid derivative, or a combination thereof of the formula:

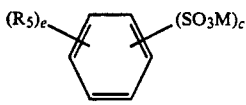

wherein;

c is 1, 2 or 3;

e is 0, 1 or 2;

$R_5$ is alkyl or alkyl substituted with one or more fluoro, or any two $R_5$ groups together may form an alkenylene chain completing a naphthalene fused system which may be substituted with on or more sulfonic acid or sulfonic acid salt group; and M is a proton, or other metal or non-metal cation, with the proviso that at least one of M is a proton.

33. The process of claim 1 wherein step (b) is carried out in the presence of a solvent in which said conjugated monomer or said conjugated monomer mixture and said effective oxidizing agent as soluble.

34. The process of claim 1 wherein said substrate is an oriented homopolymer or copolymer wherein said film or coating is optically and electrically anisotropic.

35. A composite prepared by the process of claim 1.

36. An article comprising a body, said body formed totally or in part from the composite of claim 35.

37. The article of claim 36 wherein said body comprises a nonelectrically conductive portion and an electrically conductive portion formed totally or in part from the composite of claim 35.

38. The article of claim 37 wherein said electrically conductive portion is a through-hole interconnect.

39. The process of claim 1 wherein said substrate is contacted with said initiating agent in a predetermined pattern on a surface of said substrate and said conjugated backbone homopolymer or copolymer is formed on said surface of said substrate in said predetermined pattern.

40. A process of forming a composite comprising a conjugated backbone homopolymer or copolymer on a substrate, said process comprising contacting one or more conjugated monomers with a substrate having one or more sites for initiation of the oxidative polymerization of said monomers, said sites having an oxidation potential less than that of said monomers and when oxidized, capable of reacting with and coupling to said monomers to initiate the oxidative polymerization of said monomers to form said conjugated backbone homopolymer or copolymer in the presence of an effective amount of an effective oxidizing agent having an oxidation potential greater than the oxidation potential of said initiating sites such that said oxidizing agent oxidizes said initiating sites to promote polymerization of said conjugated monomers to form said conjugated backbone homopolymer or copolymer on a surface of said substrate.

* * * * *